US008553222B2

(12) United States Patent
Brady et al.

(10) Patent No.: US 8,553,222 B2
(45) Date of Patent: Oct. 8, 2013

(54) CODED APERTURE SNAPSHOT SPECTRAL IMAGER AND METHOD THEREFOR

(75) Inventors: David Jones Brady, Durham, NC (US); Scott Thomas McCain, Durham, NC (US); Andrew David Portnoy, Durham, NC (US)

(73) Assignees: Duke University, Durham, NC (US); Applied Quantum Technologies, Durham, NC (US)

( * ) Notice: Subject to any disclaimer, the term of this patent is extended or adjusted under 35 U.S.C. 154(b) by 0 days.

(21) Appl. No.: 13/340,893

(22) Filed: Dec. 30, 2011

(65) Prior Publication Data

US 2012/0105844 A1    May 3, 2012

Related U.S. Application Data

(63) Continuation of application No. 12/422,031, filed on Apr. 10, 2009, now Pat. No. 8,149,400.

(60) Provisional application No. 61/167,335, filed on Apr. 7, 2009.

(51) Int. Cl.
*G01J 3/02* (2006.01)
(52) U.S. Cl.
USPC .......................................... 356/310
(58) Field of Classification Search
USPC ................................. 356/328, 310
See application file for complete search history.

(56) References Cited

U.S. PATENT DOCUMENTS

| 3,971,065 A | 7/1976 | Bayer |
| 5,048,959 A | 9/1991 | Morris et al. |
| 5,157,298 A | 10/1992 | Kawabata |
| 5,627,639 A * | 5/1997 | Mende et al. ............. 356/310 |
| 6,122,051 A | 9/2000 | Ansley et al. |
| 7,135,698 B2 | 11/2006 | Mitra |
| 7,301,625 B2 | 11/2007 | Brady et al. |
| 7,336,353 B2 | 2/2008 | Brady et al. |
| 7,573,579 B2 | 8/2009 | Brady |
| 2005/0174573 A1 | 8/2005 | Harvey et al. |
| 2006/0038705 A1 | 2/2006 | Brady et al. |
| 2006/0072109 A1 | 4/2006 | Bodkin et al. |
| 2007/0296965 A1 | 12/2007 | Brady et al. |
| 2007/0296969 A1 | 12/2007 | Goldstein et al. |
| 2008/0074663 A1 | 3/2008 | Brady et al. |
| 2009/0201498 A1 | 8/2009 | Raskar et al. |

OTHER PUBLICATIONS

Wagadarikar et al., "Single Disperser Design for Coded Aperture Snapshot Spectral Imaging", Feb. 2008, Applied Optics, vol. 47, No. 10, pp. 44-51.*

(Continued)

*Primary Examiner* — Kara E Geisel
(74) *Attorney, Agent, or Firm* — Kaplan Breyer Schwarz Ottesen LLP

(57) ABSTRACT

The present invention enables snap-shot spectral imaging of a scene at high image generation rates. Light from the scene is processed through an optical system that comprises a coded-aperture. The optical system projects a plurality of images, each characterized by only one of a plurality of spectral components, onto a photodetector array. The plurality of images is interspersed on the photodetector array, but no photodetector receives light characterized by more than one of the plurality of spectral components. As a result, computation of the spatio-spectral datacube that describes the scene is simplified. The present invention, therefore, enables rapid spectral imaging of the scene.

15 Claims, 9 Drawing Sheets

(56) References Cited

OTHER PUBLICATIONS

Gehm et al., "Single-shot Compressive Spectral Imaging with a Dual-disperser Architecture", Oct. 2007, Optics Express, vol. 15, No. 21, pp. 14014-14027.*

J.J.M. In 'T Zand, "The optimum open fraction of coded apertures. With an application to the wide field X-ray cameras of SAX", "Astronomy and Astrophysics", Jan. 31, 1994, pp. 665-674, No. 288, Publisher: EDP Sciences, Published in: EP.

Geisel, Kara E., "U.S. Appl. No. 12/422,031 Officw Action Sep. 22, 2011", , Publisher: USPTO, Published in: US.

* cited by examiner

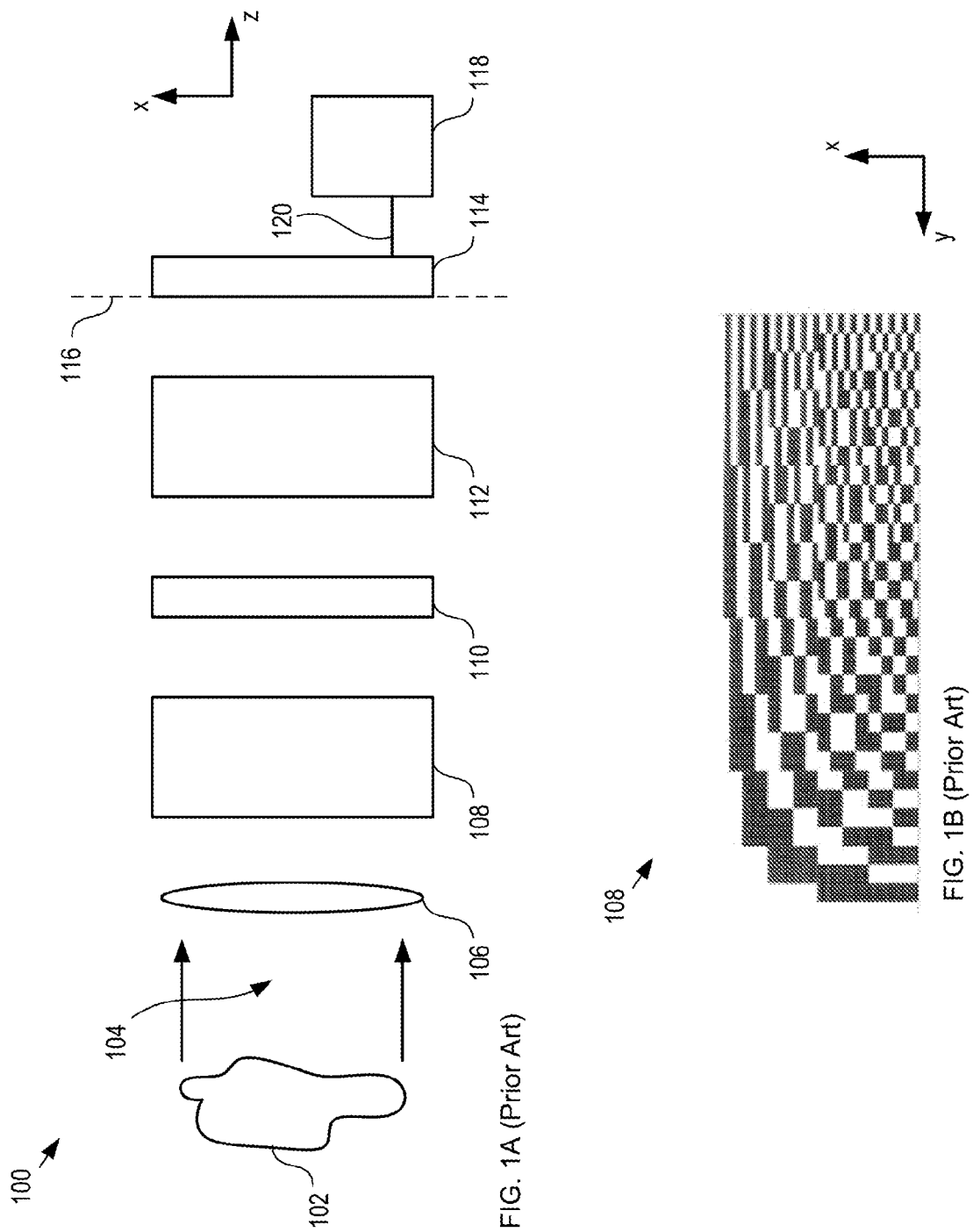

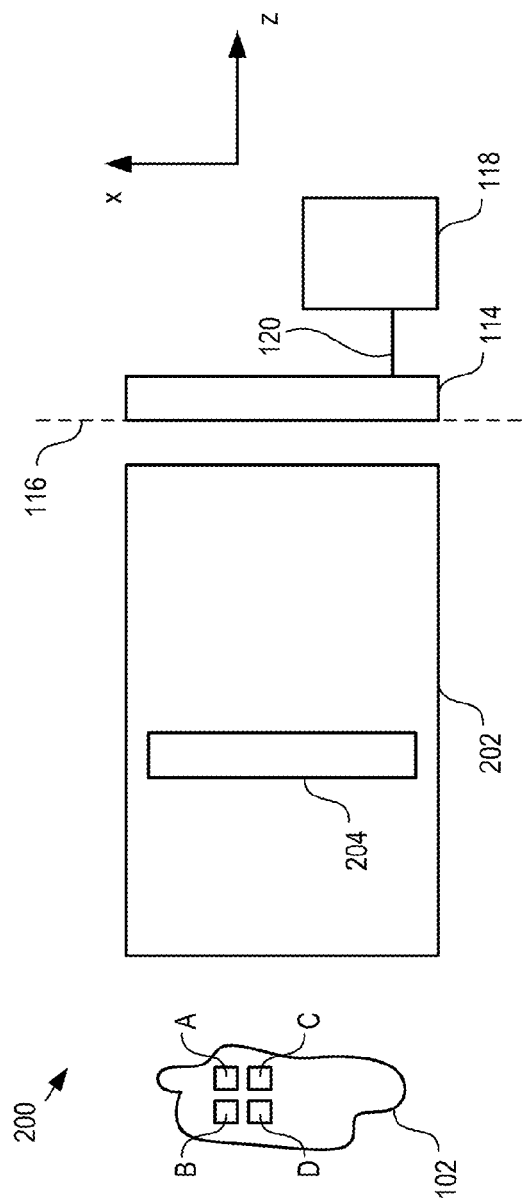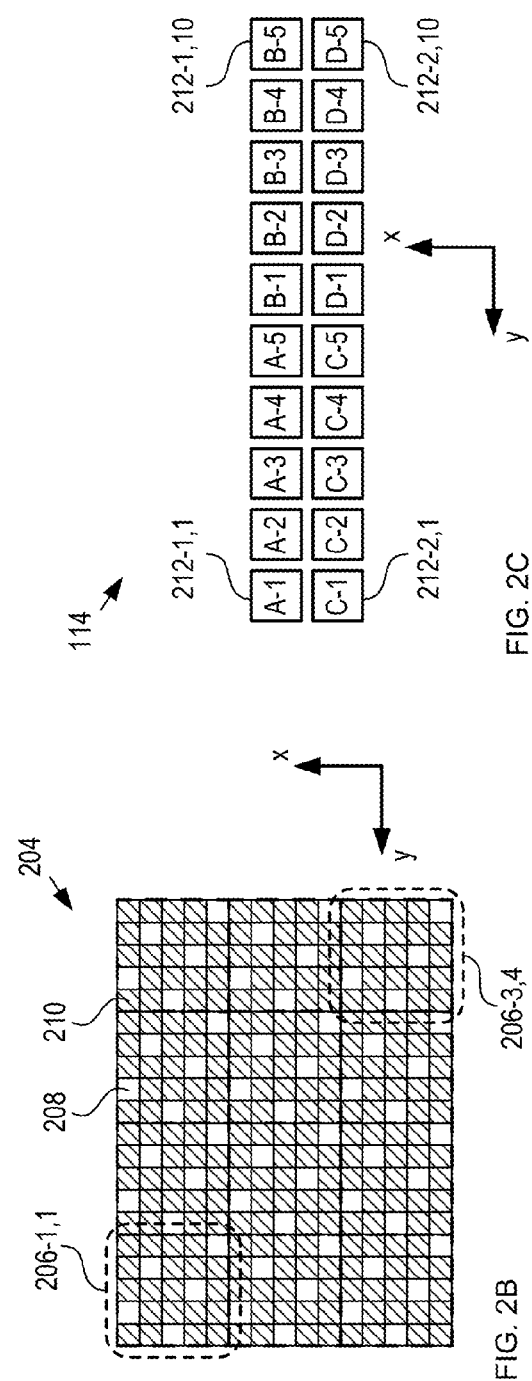

CODED APERTURE SNAPSHOT SPECTRAL IMAGER AND METHOD THEREFOR

CROSS REFERENCE TO RELATED APPLICATIONS

This case is a continuation of co-pending U.S. patent application Ser. No. 12/422,031, filed Apr. 10, 2009, which claims the benefit of U.S. Provisional Patent Application Ser. No. 61/167,335, filed Apr. 7, 2009, each of which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to imaging in general, and, more particularly, to spectral imaging.

BACKGROUND OF THE INVENTION

Spectral imaging is a technique for generating a spatial map of the wavelength variations of light from a scene. It has found use in many applications, such as environmental sensing, military and civilian surveillance, homeland security, military target discrimination, astrophysics, metrology, and biomedical imaging.

The spatial map generated using spectral imaging is often referred to as a spatio-spectral datacube. Such a datacube comprises a dataset of pixels (referred to as "voxels"), each of which is characterized by a two-dimensional spatial coordinate and a spectral coordinate. Typically, a spatio-spectral datacube is developed for several wavelengths (a.k.a., spectral components) of interest.

Several techniques for spectral imaging have been developed, including tomographic imaging, pushbroom imaging, and snap-shot imaging.

Tomographic spectral imaging develops a datacube by sequentially forming images at each of a several wavelengths. Typically, a dispersive element, such as a prism or diffraction grating, is rotated through a series of positions to spread the spectral components at a plurality of directions onto the photodetector array. At each position, the photodetector array generates a spatial map of the overlapped spatial and spectral voxels of a scene. A processor then compiles all of the individual spatial-spectral maps into a spectral datacube.

The optical efficiency of a tomographic imager is typically quite high; therefore, such imagers are useful in low-light applications. Unfortunately, tomographic spectral imagers are very slow since each image must be acquired while the scene is substantially static. Further, the geometry of such systems normally limits the range of angles over which the dispersive element can be rotated and, therefore, the number of spectral components that can be included in the datacube.

Pushbroom spectral imagers (and related techniques such as whisk broom imagers and tunable filter imagers) develop a datacube by capturing a one- or two-dimensional subset of the datacube and then temporally scanning to obtain the remaining dimension(s). Such imagers typically require high light input and have very poor signal-to-noise ratios. Further, such imagers are not particularly applicable for imaging non-static scenes.

A number of snap-shot imagers have been developed to overcome many of the limitations of tomographic and temporally scanned imagers. A snap-shot imager provides all of the information of the data cube to a photodetector array at one time; however, the information is multiplexed over the array of photodetectors. One such conventional snap-shot imager, often referred to as a "coded-aperture snap-shot imager (CASSI)," employs a coded aperture and one or more dispersive elements to modulate the multi-spectral optical field received from a scene. In a CASSI system, a photodetector array receives the modulated optical field as a single two-dimensional projection of the scene, where each pixel of the photodetector array measures light of one of the plurality of spatial-spectral components of the datacube. The manner in which the multiple projections are multiplexed is dependent upon the design of the coded aperture and the relative position of the coded aperture and the dispersive elements.

While a snap-shot imager acquires all of the desired spectral information of a scene simultaneously, the unraveling (i.e., demultiplexing) the multiple projections to assemble the datacube can be quite computationally complex. As a result, spectral image computation time can be time-consuming. This limits the operation rate for such spectral imagers, which precludes their use in many high-speed imaging applications.

SUMMARY OF THE INVENTION

The present invention enables a spectral imager without some of the costs and disadvantages of the prior art. Embodiments of the present invention are particularly well suited for applications in security, environmental, biological, metrology, and military applications.

In particular, the illustrative embodiment of the present invention processes light from a scene to provide a spatio-spectral map (i.e., a spectral image) of the scene. The light, which comprises a plurality of spectral components, is processed through an optical system that includes a sparse-coded aperture having a plurality of transmissive regions. The optical system provides a plurality of images of the scene on a detector image plane. These images are interspersed on the detector image plane, and each of the images is characterized by only one of the plurality of spectral components. A photodetector array is located at the detector image plane and each photodetector in the array receives light that has only one of the plurality of spectral components. As result, computation of the spatio-spectral datacube that describes the scene is relatively simple as compared to that required in prior-art spectral imagers. The present invention, therefore, enables rapid spectral imaging of the scene.

In some embodiments, the sparse-coded aperture comprises a plurality of fields, each comprising a plurality of equally spaced regions. In each field, less than 50% of the regions are transmissive and greater than 50% is non-transmissive. In some embodiments, the spacing of the transmissive regions within each field enables each spectral component passed through each transmissive field to be incident on a different photodetector of the photodetector array.

In some embodiments, the sparse-coded aperture comprises a plurality of fields of regions. Each field comprises n rows of regions and n columns of regions, where n is the number of spectral components of interest in the light from the scene. Each row of regions includes one region that is transmissive and (n−1) regions that are non-transmissive. Further no two transmissive regions in the coded aperture are contiguous.

In some embodiments, the sparse-coded aperture is imaged onto the image plane through a disperser. The disperser spatially disperses the spectral components transmitted by each of the plurality of transmissive regions of the coded aperture. These spectral components are dispersed along a first dimension on the detector image plane, where each spectral component is received by a different photodetector. The first dimension is substantially aligned with the rows of the sparse-coded aperture. Collectively, each spectral component from all of the transmissive regions of the plurality of transmissive regions forms an image characterized by that spectral component. The plurality of spectral components from all of the transmissive regions, therefore, form a plurality of images of the scene that are interspersed and dispersed along the first dimension on the detector image plane.

In some embodiments, the scene is imaged onto the sparse-coded aperture through a first disperser. The first disperser spatially disperses the spectral components of the scene along a first dimension at the coded aperture, wherein the first dimension is substantially aligned with the rows of the coded aperture. Each of the transmissive regions selectively transmits one spectral component for each of several spatial locations, based upon the position of the transmissive region on the mask. Each transmissive region within each field of the coded aperture transmits a different one of the plurality of spectral components. Collectively, therefore, all of the transmissive regions within each field of the coded aperture transmit the plurality of spectral components. The coded aperture is imaged onto the detector image plane through a second disperser that removes the dispersion introduced by the first disperser.

In some embodiments, the scene is imaged onto a first sparse-coded aperture, which is imaged onto a second sparse-coded aperture through a first disperser. As a result, the spectral components from each transmissive region of the first coded aperture are spatially dispersed along a first dimension on the second coded aperture, wherein the first dimension is substantially aligned with the rows of the first and second coded apertures. The second coded aperture "combs" the dispersed spectral components from the first coded aperture to create very narrow channel widths for each spectral component. Finally, the second coded aperture is imaged onto the detector image plane through a second disperser. The second disperser removes some, but not all, of the dispersion introduced by the first disperser.

In some embodiments, a plurality of lenses, such as a lenslet array, is used to image a first image plane (e.g., a sparse-coded aperture) onto a second image plane (e.g., the detector image plane). Each of the plurality of lenses images a different area of the first image plane. Such embodiments mitigate the challenges of lens design associated with large aperture lenses and allow for more compact optical systems. As a result, these embodiments can further reduce the complexity, cost, and volume of spectral imagers.

The illustrative embodiment of the present invention comprises a spectral imager comprising: (1) an optical system comprising (i) an imaging element that receives light from a scene, wherein the light comprises a plurality of spectral components, and wherein the imaging element images the scene onto a first coded aperture located at a first image plane, and (ii) the first coded aperture; wherein the optical system provides a plurality of images of the scene on a second image plane, and wherein each of the plurality of images is uniquely characterized by a different one of the plurality of spectral components, and further wherein the plurality of images are interspersed at the second image plane; and (2) a photodetector array located at the second image plane, wherein the photodetector array receives the plurality of images, and wherein each photodetector of the photodetector array receives light that is characterized by only one of the plurality of spectral components.

BRIEF DESCRIPTION OF THE DRAWINGS

FIG. 1A depicts a schematic diagram of a portion of a snap-shot spectral imager in accordance with the prior art.

FIG. 1B depicts a portion of a coded aperture in accordance with the prior art.

FIG. 2A depicts a schematic diagram of a snap-shot spectral imager in accordance with an illustrative embodiment of the present invention.

FIG. 2B depicts a portion of a sparse-coded aperture in accordance with the illustrative embodiment of the present invention.

FIG. 2C depicts a portion of photodetector array 114 in accordance with the illustrative embodiment of the present invention.

DETAILED DESCRIPTION

Figure 3:
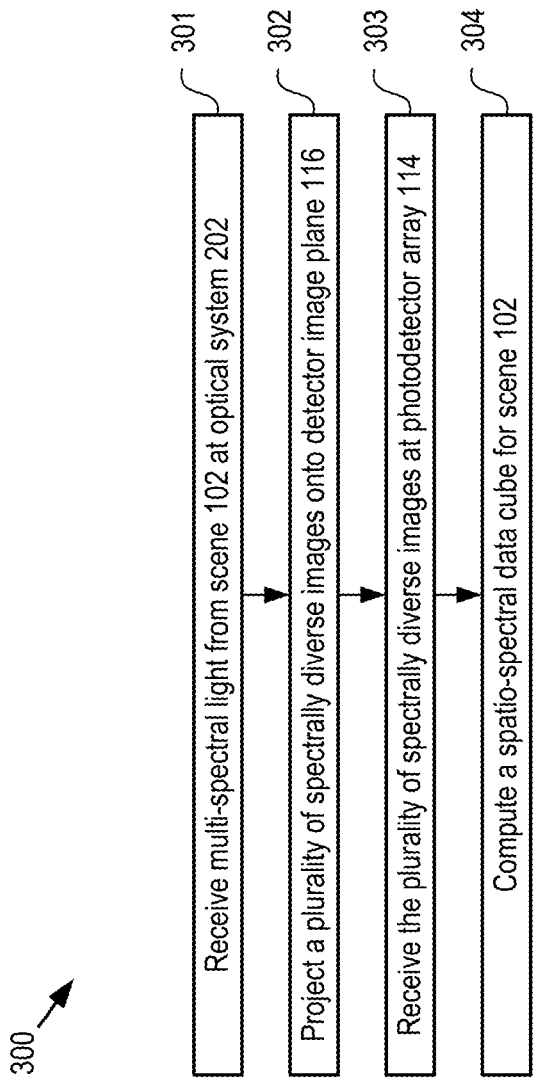
FIG. 3 depicts operations of a method for spectrally imaging a scene in accordance with the illustrative embodiment of the present invention.

The following terms are defined for use in this Specification, including the appended claims:
Plurality of spectral components is defined as those spectral components of interest for the development of a datacube. In some cases, light might include additional spectral components beyond those pertinent to the development of the datacube. These additional spectral components are disregarded, vis-à-vis the use of the term "plurality of spectral components."
Transmissive is defined as substantially transparent for the plurality of spectral components. For example, a transmissive region passes light characterized by any of the plurality of spectral components without significant attenuation.
Non-transmissive is defined as substantially opaque for the plurality of spectral components.

FIG. 1A depicts a schematic diagram of a portion of a snap-shot spectral imager in accordance with the prior art. Imager 100 comprises lens 106, disperser 108, coded aperture 110, disperser 112, and photodetector array 114.

Imager 100 projects projections, g, of scene 102 onto detector image plane 116 according to the formula $$g = \Sigma h_{ijk} f_{ijk}, \quad (1)$$

where $h_{ijk}$ represents the projection performed by coded aperture 110, $f_{ijk}$ represents voxels that collectively compose the spatio-spectral datacube for scene 102, and i and j are the spatial positions of each voxel, while k is wavelength.

In typical operation, lens 106 receives light 104 from scene 102. Typically, lens 106 is a bulk-optic refractive lens, although in some prior-art systems a different imaging element, such as a diffractive or holographic lens, spherical mirror, parabolic mirror, or other reflective optical element is used to collect light 104. Light 104 comprises a plurality of spectral components having five spectral components.

Lens 106 images scene 102 onto coded aperture 110 through disperser 108. Disperser 108 disperses the spectral components in light 104 along one dimension (e.g., the y direction) of coded aperture 110.

Disperser 108 is a conventional dispersive element or optical system that comprises a transmissive or reflective element such as a prism, diffraction grating, hologram, and the like. In some cases, such a disperser might include relay optics.

FIG. 1B depicts a portion of a coded aperture in accordance with the prior art. Coded aperture 110 is representative of a conventional coded aperture having a coded matrix used in spectral imaging applications. White regions of aperture 110 are transmissive and black regions are non-transmissive. In some cases, black regions represent areas of the aperture that are completely opaque.

Coded aperture 110 is then imaged onto detector image plane 116 through disperser 112. Disperser 112 is analogous to disperser 108.

When aperture 110 is imaged, the spectral information at each spatial location is encoded with a properly shifted version of the code $h_{ijk}$ of the aperture. Disperser 112 removes the dispersion introduced by disperser 108 and a plurality of projections is multiplexed onto detector image plane 116.

Photodetector array 114 is located at detector image plane 116 such that the projections are imaged onto its photodetectors. As a result, some or all of the photodetectors receive light from multiple projections simultaneously.

Processor 118 receives electrical signals 120 from photodetector array 114. Processor 118 employs an estimation algorithm to infer the spatio-spectral information for scene 102 from the multiplexed projections. The performance of imager 100 depends primarily on the design of the coding pattern for aperture 110 and the inference algorithms used by processor 118 to decode the output of photodetector 114.

Since multiple projections are simultaneously multiplexed onto the photodetectors of photodetector array 114, computation of the spatio-spectral datacube from the output of photodetector array 114 can be quite complex. As a result, although signal acquisition time is short for a snap-shot imager, spectral image computation time can severely limit the operation rate for prior art spectral imagers. Some or all of the advantages inherent to a snap-shot imager, therefore, are negated.

FIG. 2A depicts a schematic diagram of a snap-shot spectral imager in accordance with an illustrative embodiment of the present invention. Imager 200 comprises optical system 202, which comprises sparse-coded aperture 204, and photodetector array 114. Imager 200 is suitable for developing a spectral datacube of scene 102.

FIG. 2B depicts a portion of a sparse-coded aperture in accordance with the illustrative embodiment of the present invention. Sparse-coded aperture 204 (hereinafter referred to as aperture 204) comprises a two-dimensional array of fields 206. FIG. 2B depicts only some of fields 206 (i.e., fields 206-1,1 through 206-3,4). The number and arrangement of fields 206 in aperture 204 is sufficient to ensure that an image of scene 102 can be fully formed within the confines of aperture 204.

Each of fields 206 includes an n×n array of equal size regions, where n is the number of spectral components in the plurality of spectral components of the spectral datacube to be developed for scene 102. For the illustrative embodiment, each of fields 206 comprises 5 rows of regions and 5 columns of regions. Each row comprises one transmissive region 208 and 4 non-transmissive regions 210. The regions of field 206 within each field 206 are arranged such that no two transmissive regions 208 are contiguous within the field. Further, the plurality of fields 206 within aperture 204 is arranged such that no two transmissive regions 208 are contiguous within aperture 204. Although the illustrative embodiment comprises an optical system suitable for developing a spectral datacube having five spectral components, it will be clear to one skilled in the art, after reading this specification, how to make, use, and specify alternative embodiments of the present invention that are suitable for developing spectral datacubes comprising any number of spectral components.

It should be noted that the size and shape of each of the regions that compose the fields of aperture 204 is optical design dependent and/or application dependent. Although the illustrative embodiment depicts regions 208 and 210 as being square, one skilled in the art will recognize, after reading this disclosure, that any suitable shape can be used for these regions.

Optical system 202 induces a spatial dispersion along a first dimension on the plurality of spectral components transmitted through the optical system. In the illustrative embodiment, the first dimension is substantially aligned with the rows of fields 206. In some embodiments, the first dimension is aligned with the columns of fields 206.

FIG. 3 depicts operations of a method for spectrally imaging a scene in accordance with the illustrative embodiment of the present invention. Method 300 begins with operation 301, wherein optical system 202 receives light 104 is received from scene 102. As described above, and with respect to FIG. 1A, light 104 comprises a plurality of spectral components having five spectral components.

At operation 302, optical system 202 projects a plurality of images of scene 102 onto detector image plane 116, wherein each projected image is uniquely characterized by a different one of the spectral components of light 104. For the purposes of this specification, including the appended claims, the phrase "uniquely characterized by a different one of the plurality of spectral components" is defined as having light characterized by only one spectral component of the plurality of spectral components. In some cases, an image or light signal that is uniquely characterized by one of the plurality of spectral components might comprise light characterized by a spectral component that is NOT one of the plurality of spectral components (for example, light characterized by spectral component of a different dispersion order).

The projected images of scene 102 are interspersed on detector image plane 116; however, no image pixels of multiple projected images are coincident on the same photodetector (i.e., the projected images are not multiplexed on the detector image plane).

At operation 303, the projected plurality of images is received by the photodetectors of photodetector array 114, which is located at detector image plane 116. It is an aspect of the present invention that no photodetector of photodetector array 114 receives more than one spectral component of the plurality of spectral components.

FIG. 2C depicts a portion of photodetector array 114 in accordance with the illustrative embodiment of the present invention. Each of photodetectors 212-1,1 through 212-2,6 receives one of five spectral components from one of four object pixels (i.e., pixels A, B, C, and D) within scene 102. The spectral components from each pixel are distributed in contiguous fashion along a row of photodetectors. For example, photodetectors 212-1,1 through 212-1-5 receive spectral components 1 through 5, respectively, from object pixel A. In similar fashion, photodetectors 212-2,6 through 212-2,10 receive spectral components 1 through 5, respectively, from object pixel D.

At operation 304, processor 118 receives electrical signals 120 from photodetector 114. Using only electrical signals corresponding to the same spectral component, processor 118 can easily compute an image for the spectral content of scene 102 at that spectral component. For example, selecting the electrical signals from photodetectors 212-1,2, 212-1,7, 212-2,2, and 212-2,7, an image at spectral component 2 can be computed for the image portion that comprises object pixels A, B, C, and D. In this manner, processor 118 can easily and rapidly compute a complete spatio-spectral datacube for scene 102.

Because each photodetector of photodetector array 114 provides an electrical signal that is uniquely identified with one of the plurality of spectral components, the processing required of processor 118 to compute the spatio-spectral datacube is greatly simplified as compared to snap-shot spectral imaging systems in the prior art. This enables imager 200 to operate at a higher image capture rate than conventional spectral imagers. As a result, imager 200 enables spectral imaging applications that were beyond the capabilities of spectral imaging systems in the prior art.

Figure 4:
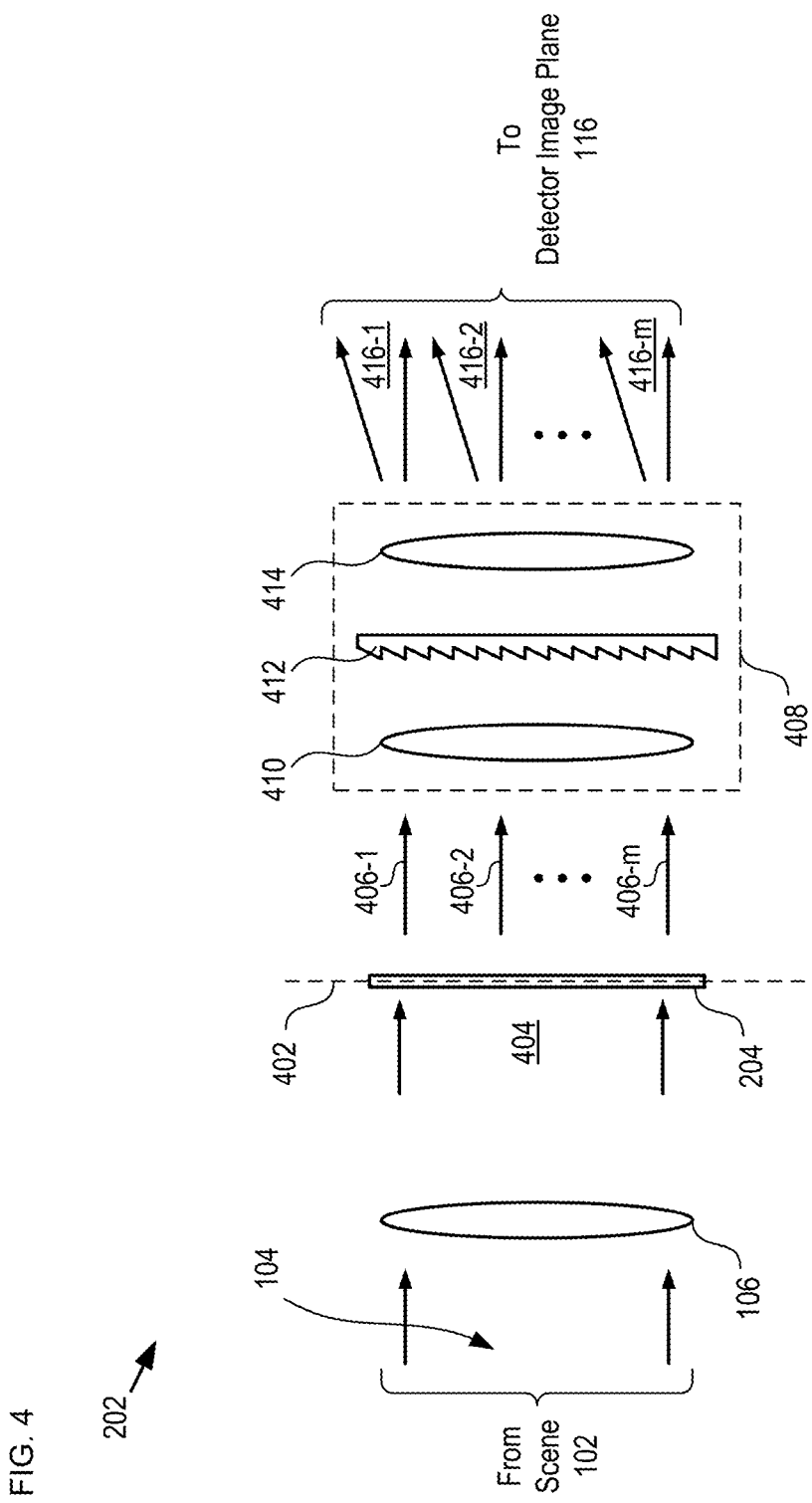
FIG. 4 depicts details of optical system 202 in accordance with the illustrative embodiment of the present invention.

FIG. 4 depicts details of optical system 202 in accordance with the illustrative embodiment of the present invention. Optical system 202 comprises lens 106, sparse-coded aperture 204, and disperser 408.

Figure 5:
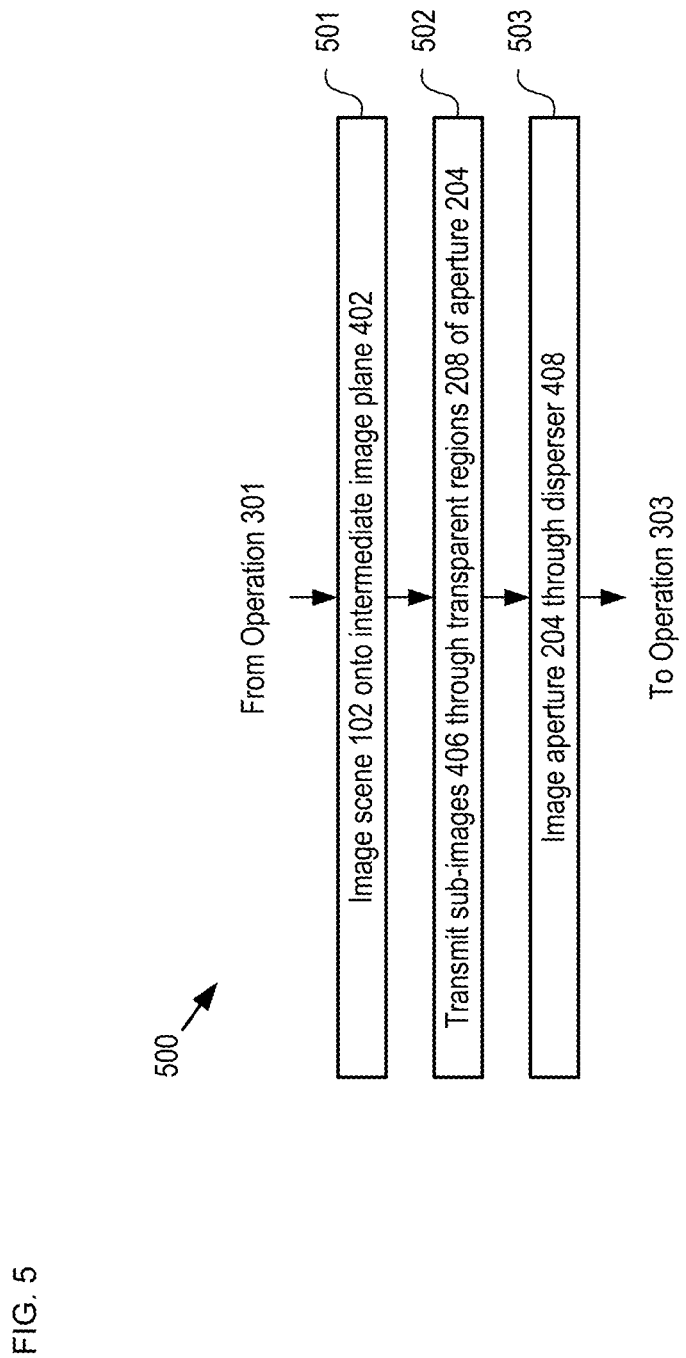
FIG. 5 depicts sub-operations of operation 302 in accordance with the illustrative embodiment of the present invention.

FIG. 5 depicts sub-operations of operation 302 in accordance with the illustrative embodiment of the present invention.

At sub-operation 501, an imaging element (i.e., refractive lens 106) receives light 104 from scene 102 and images scene 102 onto intermediate image plane 402 as multispectral image 404. Aperture 204 is located at intermediate image plane 402. Although the illustrative comprises imaging elements that are refractive lenses, it will be clear to one skilled in the art, after reading this specification, how to specify, make, and use alternative embodiments of the present invention wherein one or more imaging elements are other than refractive lenses. Imaging element suitable for use in embodiments of the present invention include, without limitation, diffractive lenses, holographic lenses, reflective lenses, and the like.

At sub-operation 502, aperture 204 spatially filters multispectral image 404 and transmits sub-images 406-1 through 406-m (collectively referred to as sub-images 406) through transmissive regions 208. Each of sub-images 406 is spatially correlated with scene 102.

At sub-operation 503, aperture 204 is imaged onto detector image plane 116 through disperser 408. Disperser 408 is a dispersive relay lens that comprises diffraction grating 412 and lenses 410 and 414. Diffraction grating 412 and lenses 410 and 414 collectively define a relay lens that introduces dispersion on each of sub-images 406. As described above, and with respect to FIGS. 2A, 2B, and 3, inducing dispersion in optical system 202 spatially separates the spectral components of light transmitted through the optical system. For example, in the illustrative embodiment, aperture 204 is imaged through disperser 408 to disperses the spectral components of each of sub-images 406. This provides pixilated spectral components 416-1 through 416-m (collectively referred to as pixilated spectral components 416). Pixilated spectral components 416 are dispersed along a first dimension on detector image plane 116 to form a plurality of pixilated spectral components. The first dimension is substantially aligned with the rows of regions within aperture 204. As discussed above, and with respect to FIG. 2A, no two pixilated spectral components are incident on the same photodetector of photodetector array 118.

It should be noted that, in some embodiments of the present invention, a disperser might comprise an element other than a diffraction grating. Suitable dispersive elements include, without limitation, holograms, diffraction gratings, and the like. It should also be noted that a suitable dispersive element might be transmissive or reflective, depending on the design of the optical system in which the disperser is included.

In the illustrative embodiment, the sparse-coded aperture comprises fields in which each row of each field has a ratio of transmissive regions to non-transmissive regions that is $1/(n-1)$, wherein n is the number of spectral components in the plurality of spectral components. After reading this specification, however, it will be clear to one skilled in the art how to make and use alternative embodiments of the present invention wherein a sparse-coded aperture comprises fields wherein the ratio of transmissive to non-transmissive fields is other than $1/(n-1)$. It is an aspect of the present invention that, in some embodiments, the sparse-coded aperture has transmissive regions that are sufficiently separated from one another to enable all of the spectral components in light transmitted through optical system 202 to be spatially dispersed onto different photodetectors of photodetector array 118, without multiplexing any two or more pixilated spectral components onto a single photodetector.

Figure 6:
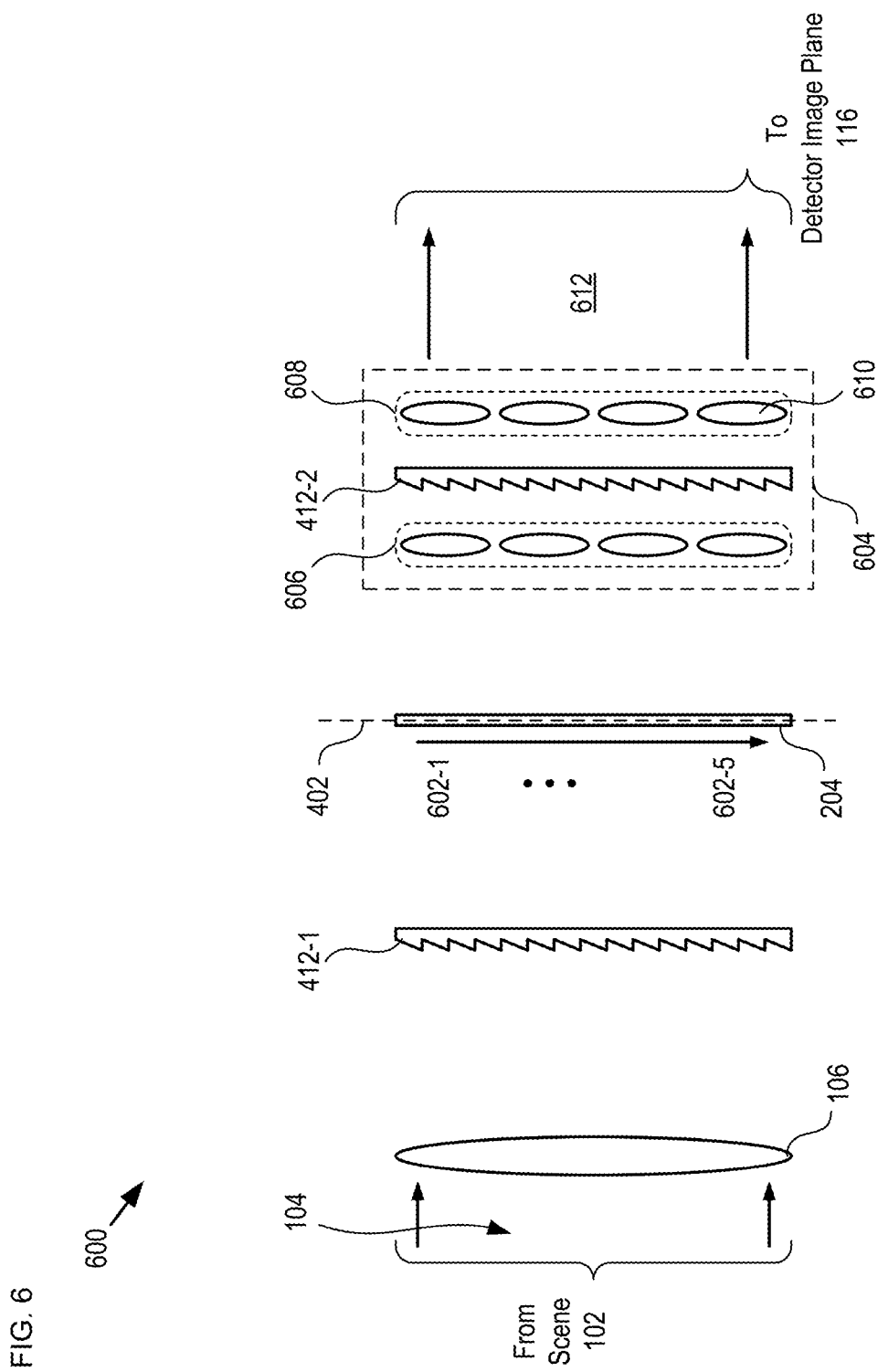
FIG. 6 depicts details of an optical system in accordance with a first alternative embodiment of the present invention.

FIG. 6 depicts details of an optical system in accordance with a first alternative embodiment of the present invention. Optical system 600 comprises lens 106, disperser 412-1, coded aperture 204, and dispersive relay lens 604. Optical system 600 is an alternative to optical system 202.

Figure 7:
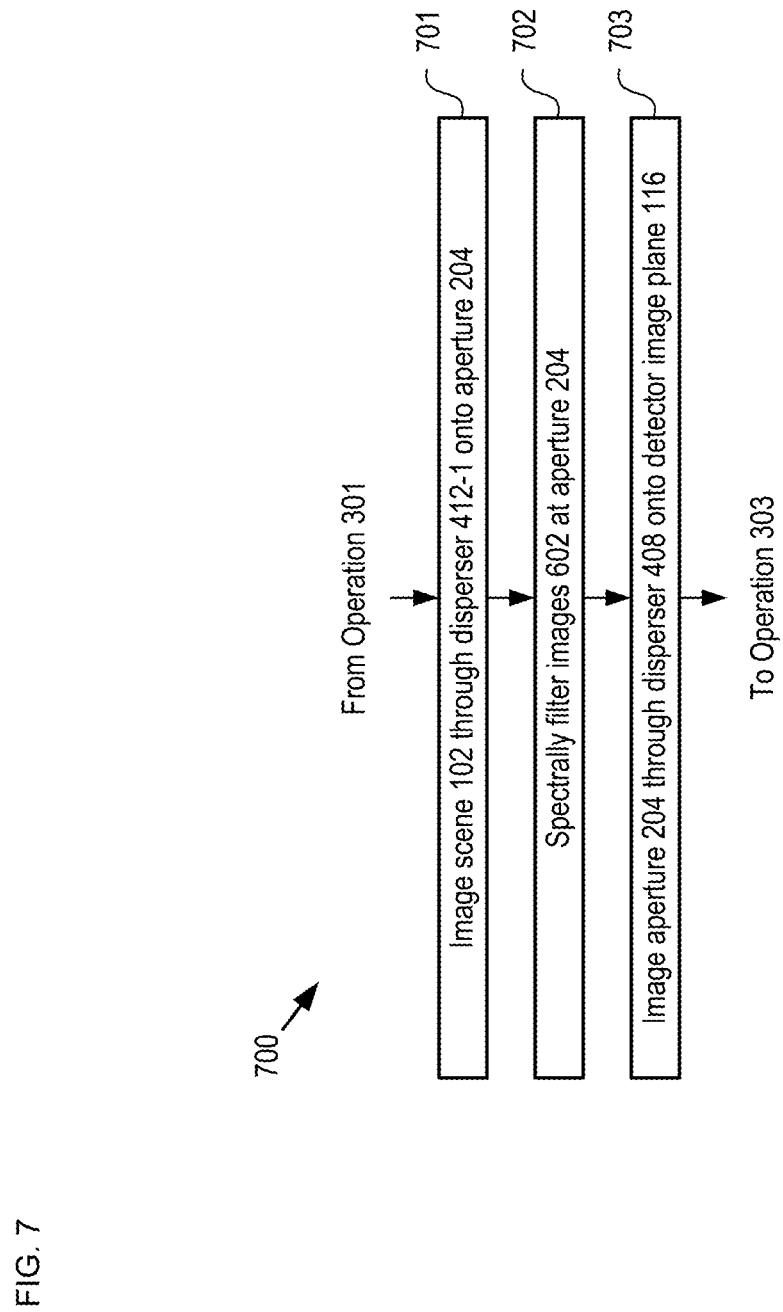
FIG. 7 depicts sub-operations of operation 302 suitable for spectrally imaging a scene in accordance with the first alternative embodiment of the present invention.

FIG. 7 depicts sub-operations of operation 302 suitable for spectrally imaging a scene in accordance with the first alternative embodiment of the present invention.

At sub-operation 701, lens 106 receives light 104 from scene 102 and images scene 102 through disperser 412-1 onto intermediate image plane 402. Disperser 412-1 introduces a lateral shift, based on wavelength, of scene 102 along a first dimension on intermediate image plane 402. For each of the plurality of spectral components of light 104, therefore, an image 602 is projected onto intermediate image plane 402. Images 602-1 through 602-5 (collectively referred to as images 602), are uniquely characterized by spectral components 1 through 5, respectively, and are dispersed in multiplexed fashion along the first dimension.

At sub-operation 702, aperture 204 receives images 602. Aperture 204 is located at intermediate image plane 402 such that the rows within fields 206 are substantially aligned with the first dimension. As discussed above, and with respect to FIG. 2B, each field 206 contains five rows of regions having five regions per row (where five is the number of spectral channels in the plurality of spectral channels of interest for the illustrative embodiment). Each row has one transmissive region 208 and the position of the transmission region 208 within each row is different for each of the five rows. As a result, each of the fields 206 selectively transmits only one spectral component from each object pixel. Collectively, therefore, aperture 204 (i.e., fields 206) spectrally filters images 602.

At sub-operation 703, aperture 204 is imaged through dispersive relay lens 604 onto detector image plane 116. Dispersive relay lens 604 removes the dispersion introduced by disperser 412-1 so that composite image 612 is projected onto detector image plane 116 such that image 612 is spatially correlated with scene 102. Image 612 comprises a plurality of spectrally diverse images that are interspersed, but not multiplexed, on detector image plane 114.

Dispersive relay lens 604 comprises diffraction grating 412-2, and lenslet arrays 606 and 608.

Each of lenslet arrays 606 and 608 comprises a plurality of lenslets 610. Each corresponding pair of lenslets 610 in lenslet arrays 606 and 608 images a different area of aperture 402. These areas are imaged in parallel in non-interfering fashion. Advantages of using a lenslet array instead of a bulk optic lens include:
  i. reduced focal length that enables a shorter overall path length; or
  ii. lower system cost; or
  iii. reduce optical system weight; or
  iv. reduced fabrication cost; or
  v. any combination of i, ii, iii, and iv.

One skilled in the art will recognize, after reading this disclosure, that each bulk optic lens, from the first intermediate image plane to the detector image plane, in any embodiment of the present invention can be replaced by a lenslet array.

Figure 8:
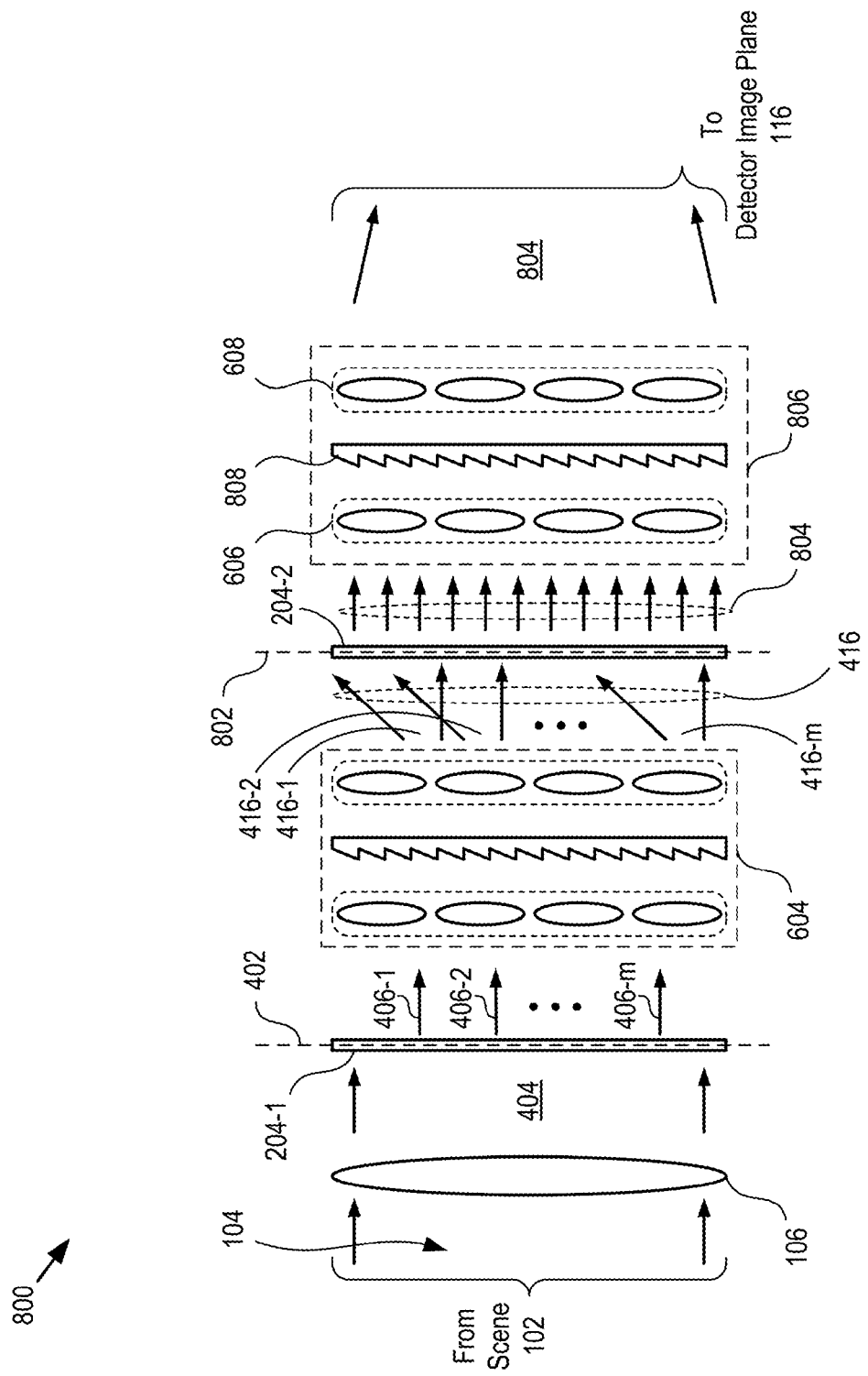
FIG. 8 depicts details of an optical system in accordance with a second alternative embodiment of the present invention.

FIG. 8 depicts details of an optical system in accordance with a second alternative embodiment of the present invention. Optical system 800 comprises lens 106, coded apertures 204-1 and 204-2, and dispersive relay lenses 604 and 806. Optical system 800 is an alternative to optical system 202.

Figure 9:
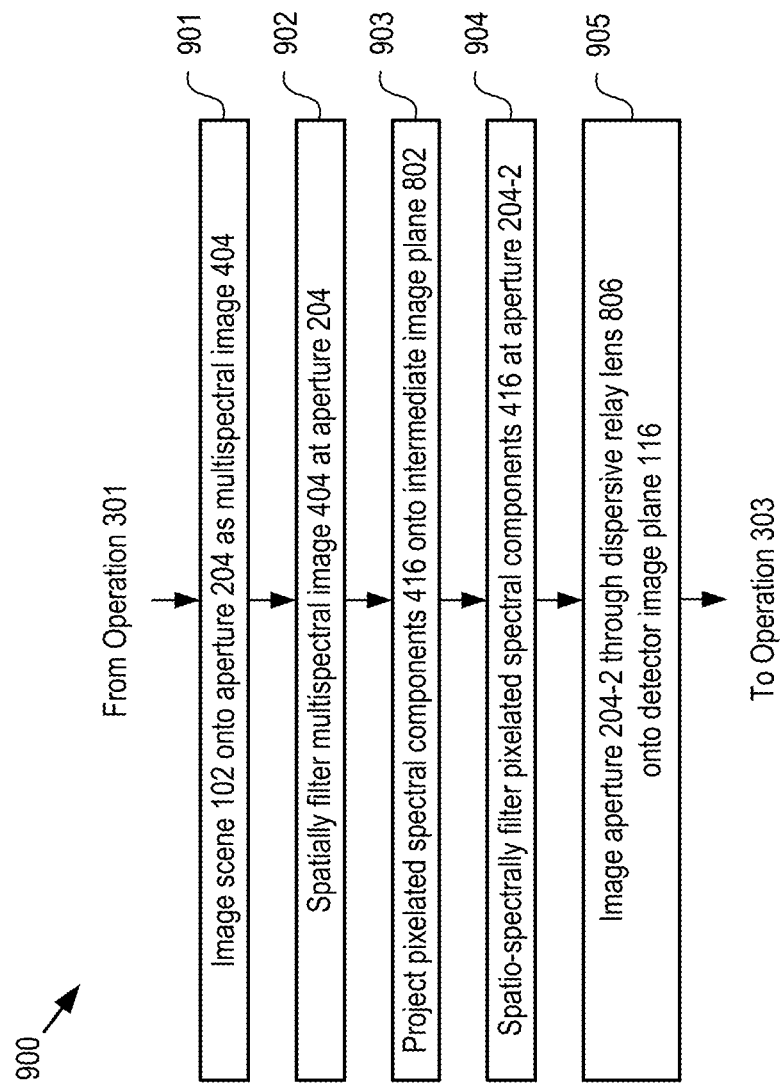
FIG. 9 depicts sub-operations of operation 302 suitable for spectrally imaging a scene in accordance with the second alternative embodiment of the present invention.

FIG. 9 depicts sub-operations of operation 302 suitable for spectrally imaging a scene in accordance with the second alternative embodiment of the present invention.

At sub-operation 901, lens 106 receives light 104 from scene 102 and images scene 102 onto intermediate image plane 402 as multispectral image 404. Aperture 204-1 is located at intermediate image plane 402 such that the rows of fields 206-1 are substantially aligned with a first dimension on intermediate image plane 402.

At sub-operation 902, aperture 204-1 spatially filters multispectral image 404 and transmits sub-images 406-1 through 406-*m* in a manner analogous to the operation of the front end of optical system 202. Each of sub-images 406 is spatially correlated with scene 102.

At sub-operation 903, aperture 204-1 is imaged through dispersive relay lens 604 onto intermediate image plane 802. As a result, pixilated spectral components 416-1 through 416-*m* are dispersed along the first dimension on intermediate image plane 802.

At sub-operation 904, aperture 204-2 receives pixilated spectral components 416. Aperture 204-2 is located at intermediate image plane 802 such that the rows of fields 206-2 are aligned with the first dimension. Each of apertures 204-1 and 204-2 is of the same design as aperture 204, described above and with respect to FIG. 2B. The periodic structure of aperture 204-2 "combs" the light received at intermediate image plane 802 and passes the combed signals as spectral components 804. Aperture 204-2 acts as a spatio-spectral filter for pixilated spectral components 416 and creates very sharp spectral widths for spectral components 804. Each of the transmissive regions of aperture 204-2 passes one pixilated spectral component from each of several sub-images 406.

At sub-operation 905, aperture 204-2 is imaged through dispersive relay lens 806 onto detector image plane 116. Dispersive relay lens 806 is analogous to dispersive relay lens 604; however, disperser 808 is selected to have less dispersion than disperser 412-2. As a result, dispersive relay lens 806 is less dispersive than dispersive relay lens 604. Dispersive relay lens 806, therefore, removes most, but not all, of the dispersion introduced by dispersive relay lens 604.

Optical system 800 enables selective measurement of a subset of the plurality of spectral bands at periodic spatial locations in two dimensions. In operation, optical system 800 maps the subset of the plurality of spectral components from an object pixel onto adjacent photodetectors of photodetector array 118. As a result, spectrally non-contiguous spectral components from a given object pixel are measured at adjacent photodetectors. As discussed above, and with respect to FIG. 2A, no two pixilated spectral components are incident on the same photodetector of photodetector array 118.

In order to enable the simultaneous measurement of the full spectrum of a plurality of object pixels, the spectral images of scene 102 are sampled with a sampling structure having a periodic structure. The periodicity of the sampling structure is based on the spectral span of the plurality of spectral components of interest.

In some embodiments, multiple stages of dispersive optics and coded masks are cascaded to extend the capabilities of optical system 800.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for providing a spectral image of a scene that includes a plurality of object pixels that are arranged in a two-dimensional arrangement, the method comprising:
  (1) projecting a plurality of first images of the scene onto a first image plane, wherein the plurality of first images are formed by operations comprising:
    (a) providing a plurality of sub-images, each sub-image being based on light from the scene that comprises a plurality of spectral components, wherein each sub-image corresponds to a different object pixel, and wherein the plurality of sub-images and the plurality of object pixels are spatially correlated; and further wherein the plurality of sub-images is provided by operations comprising;
      (i) providing a coded aperture that is located at a second image plane, the coded aperture comprising a plurality of fields, each having a plurality of equally spaced regions, wherein greater than 50% of the regions within each field are non-transmissive; and
      (ii) enabling the coded aperture to transmit the plurality of sub-images such that each of the plurality of sub-images comprises the plurality of spectral components; and
    (b) projecting the plurality of sub-images onto a first image plane such that the spectral components of each sub-image are spatially dispersed along a first direction; and
  (2) receiving the plurality of first images at a photodetector array that is located at the first image plane, wherein each photodetector in the photodetector array receives light that is characterized by only one of the plurality of spectral components.

2. The method of claim 1 further comprising providing the coded aperture such that each field has n rows of regions aligned with the first dimension and n columns of regions aligned with a second dimension, where n is the number of spectral components in the plurality of spectral components, and wherein each row comprises 1 transmissive region and (n−1) non-transmissive regions, and further wherein no two transmissive regions within the coded aperture are contiguous.

3. The method of claim 1 wherein the plurality of sub-images is projected onto the first image plane by operations comprising imaging the coded aperture onto the first image plane through a disperser that disperses the spectral components of each of the plurality of sub-images along the first dimension.

4. The method of claim 3 wherein the coded aperture is imaged onto the first image plane by a plurality of imaging elements, and wherein each of the plurality of imaging elements images a different area of the coded aperture onto the first image plane.

5. A method for providing a spectral image of a scene that includes a plurality of object pixels arranged in a two-dimensional arrangement, the method comprising:
  (1) providing a plurality of first images of the scene, the plurality of first images being provided by operations comprising:
    (a) providing a first coded aperture that is located at a first image plane, wherein the coded aperture comprises a plurality of fields, each having a plurality of equally spaced regions, and wherein greater than 50% of the regions within each field are non-transmissive;
    (b) forming a first image at the first coded aperture, the first image being formed by imaging the scene through a first disperser that induces a first dispersion along a first dimension;
    (c) transmitting at least a portion of the first image through the coded aperture; and
    (d) imaging the coded aperture onto a second image plane through a second disperser, wherein the second disperser removes the induced first dispersion; and
  (2) receiving the plurality of first images at a photodetector array that is located at the second image plane, wherein each photodetector in the photodetector array receives light that is characterized by only one of the plurality of spectral components.

6. The method of claim 5 further comprising providing the coded aperture such that each field has n rows of regions aligned with the first dimension and n columns of regions aligned with a second dimension, where n is the number of spectral components in the plurality of spectral components, and wherein each row comprises 1 transmissive region and (n−1) non-transmissive regions, and further wherein no two transmissive regions within the coded aperture are contiguous.

7. The method of claim 5 wherein the coded aperture is imaged onto the second image plane by a plurality of imaging elements, and wherein each of the plurality of imaging elements images a different area of the coded aperture onto the second image plane.

8. A method for providing a spectral image of a scene that includes a plurality of object pixels arranged in a two-dimensional arrangement, the method comprising:
  (1) providing a plurality of first images of the scene, the plurality of first images being provided by operations comprising:
    (a) imaging the scene onto a first coded aperture that is located at a first image plane;
    (b) imaging the first coded aperture onto a second coded aperture located at a second image plane, wherein the first coded aperture is imaged onto the second coded aperture through a first disperser that induces a first dispersion along a first dimension; and
    (c) imaging the second coded aperture onto a third image plane, wherein the second coded aperture is imaged onto the third image plane through a second disperser, and wherein the second disperser is less dispersive than the first disperser; and
  (2) receiving the plurality of first images at a photodetector array that is located at the third image plane, wherein each photodetector in the photodetector array receives light that is characterized by only one of the plurality of spectral components.

9. The method of claim 8 wherein the first coded aperture is imaged onto the second coded aperture by a first plurality of imaging elements, and wherein each of the first plurality of imaging elements images a different area of the first coded aperture at the second coded aperture, and wherein the second coded aperture is imaged onto the third image plane by a second plurality of imaging elements, and further wherein each of the second plurality of imaging elements images a different area of the second coded aperture onto the third image plane.

10. The method of claim 8 further comprising providing the first coded aperture, wherein the first coded aperture comprises an array of fields, and wherein each field has n rows of regions aligned with the first dimension and n columns of regions aligned with a second dimension, where n is the number of spectral components in the plurality of spectral components, and wherein each row comprises 1 transmissive region and (n−1) non-transmissive regions, and further wherein no two transmissive regions within the first coded aperture are contiguous.

11. The method of claim 10 further comprising providing the second coded aperture, wherein the second coded aperture comprises an array of fields, and wherein each field has n rows of regions aligned with the first dimension and n columns of regions aligned with a second dimension, where n is the number of spectral components in the plurality of spectral components, and wherein each row comprises 1 transmissive region and (n−1) non-transmissive regions, and further wherein no two transmissive regions within the second coded aperture are contiguous.

12. The method of claim 10 further comprising providing the second coded aperture, wherein the second coded aperture comprises an array of fields, and wherein each field has a plurality of equally spaced regions, and further wherein greater than 50% of the regions within each field are non-transmissive.

13. The method of claim 8 further comprising providing the first coded aperture, wherein the first coded aperture comprises an array of fields, and wherein each field has a plurality of equally spaced regions, and further wherein greater than 50% of the regions within each field are non-transmissive.

14. The method of claim 13 further comprising providing the second coded aperture, wherein the second coded aperture comprises an array of fields, and wherein each field has a plurality of equally spaced regions, and further wherein greater than 50% of the regions within each field are non-transmissive.

15. The method of claim 13 further comprising providing the second coded aperture, wherein the second coded aperture comprises an array of fields, and wherein each field has n rows of regions aligned with the first dimension and n columns of regions aligned with a second dimension, where n is the number of spectral components in the plurality of spectral components, and wherein each row comprises 1 transmissive region and (n−1) non-transmissive regions, and further wherein no two transmissive regions within the second coded aperture are contiguous.

\* \* \* \* \*